United States Patent
Bischoff et al.

(10) Patent No.: US 7,608,302 B2
(45) Date of Patent: Oct. 27, 2009

(54) METHOD FOR SUPPRESSING REACTION OF MOLTEN METALS WITH REFRACTORY MATERIALS

(75) Inventors: Todd F. Bischoff, Veradale, WA (US); Richard S. Bruski, Spokane, WA (US); Robert B. Wagstaff, Greenacres, WA (US)

(73) Assignee: Novelis Inc., Toronto, Ontario (CA)

( * ) Notice: Subject to any disclaimer, the term of this patent is extended or adjusted under 35 U.S.C. 154(b) by 0 days.

(21) Appl. No.: 11/827,693

(22) Filed: Jul. 13, 2007

(65) Prior Publication Data

US 2007/0252308 A1    Nov. 1, 2007

Related U.S. Application Data

(62) Division of application No. 10/735,057, filed on Dec. 11, 2003, now abandoned.

(51) Int. Cl.
   *B05D 3/02*  (2006.01)
(52) U.S. Cl. .................................................. 427/397.7
(58) Field of Classification Search ............... 427/397.7
   See application file for complete search history.

(56) References Cited

U.S. PATENT DOCUMENTS

| | | | |
|---|---|---|---|
| 2,160,924 A | 6/1939 | Sullivan | |
| 2,502,418 A | 4/1950 | Callis | |
| 2,698,256 A | 12/1954 | Shea et al. | |
| 2,912,341 A | 11/1959 | Ricker | |
| 2,997,402 A | 8/1961 | McDonald et al. | |
| 3,078,173 A | 2/1963 | Dolph | |
| 3,819,535 A * | 6/1974 | Huba et al. | 502/304 |
| 4,126,474 A | 11/1978 | Talley et al. | |
| 4,430,121 A | 2/1984 | Shima | |
| 4,622,070 A | 11/1986 | Sakurai et al. | |
| 4,690,867 A | 9/1987 | Yamamoto et al. | |
| 4,762,811 A | 8/1988 | Vayda et al. | |
| 4,897,294 A | 1/1990 | Libby et al. | |
| 4,992,395 A | 2/1991 | Dulberg et al. | |
| 5,039,634 A | 8/1991 | Dulberg et al. | |
| 5,049,324 A * | 9/1991 | Morris et al. | 264/30 |
| 6,008,152 A | 12/1999 | Guillo et al. | |
| 6,066,289 A | 5/2000 | Eckert | |
| 6,407,023 B1 | 6/2002 | Prior et al. | |
| 6,548,436 B2 | 4/2003 | Prior et al. | |
| 6,589,900 B1 * | 7/2003 | Kotze | 501/128 |
| 2004/0202608 A1 * | 10/2004 | Selter | 423/659 |

FOREIGN PATENT DOCUMENTS

| | | |
|---|---|---|
| EP | 0 763 392 A2 | 3/1997 |
| GB | 590816 B1 | 9/1946 |
| WO | WO 00/17127 A1 | 3/2000 |

* cited by examiner

*Primary Examiner*—Michael Cleveland
*Assistant Examiner*—Nathan H Empie
(74) *Attorney, Agent, or Firm*—Cooper & Dunham LLP

(57) ABSTRACT

A method is described for improving resistance to chemical attack by aluminum or magnesium in refractory components. In one method, a slurry is formed comprising calcium silicate-containing refractory material and a barium-containing compound. This slurry is placed in a mold, then dewatered to form a component which is hydrothermally processed to form a final component. In a second procedure, a silica-containing porous refractory component is impregnated with an aqueous solution of an oxide or hydroxide of barium or strontium and thereafter dried in air.

14 Claims, No Drawings

METHOD FOR SUPPRESSING REACTION OF MOLTEN METALS WITH REFRACTORY MATERIALS

CROSS REFERENCE TO RELATED APPLICATION

This application is a division of U.S. patent application Ser. No. 10/735,057, filed Dec. 11, 2003, now abandoned.

FIELD OF THE INVENTION

The invention generally relates to additives to refractory materials and methods for suppressing reactions between the refractory materials and molten aluminum or magnesium alloys.

BACKGROUND OF THE INVENTION

Silicate-containing refractory components are widely used in aluminum casting operations for containment of molten aluminum. Examples of these include refractory liners, bricks, boards and casting mould components. The silicate adds strength, heat conductance and resistance to thermal shock. However, addition of silicate to the components also introduces some inadequacies, which have received increased attention in the past few years.

A common problem with silicate-containing refractory components is that they react with the molten aluminum or magnesium, which results in the $SiO_2$ component being reduced to Si, which then becomes dissolved in the melt, resulting in gradual deterioration of the refractory.

In refractories intended for use as bricks, castable mixtures, ramming mixes and the like it has been found that the addition of barium sulphate, carbonate or oxide to a "green" refractory mix before firing, yields a refractory that is more resistant to aluminum attack once it has been fired. Such refractories have found used in melting and holding furnaces for molten aluminum, and various troughs and similar vessels for transferring molten aluminum.

U.S. Pat. No. 4,992,395 (Dulberg et al.) discloses moldable mixture of fibres (alumina, aluminum silicate, mullite, calcium aluminum silicate, mineral wool or silicon carbide), colloidal silica, binders (organic polymers, particularly those with polar groups), 1 to 15% barium sulphate (for example in the form of the mineral baryte) which are formed into mouldable mixtures using water or water-ethylene glycol mixtures, shaped and fired at 1500° F. (815° C.) before use. The mixture showed excellent resistance to molten aluminum.

U.S. Pat. No. 4,762,811 (Vayda et al) discloses an hydraulic setting castable refractory containing aggregate (such as fused bauxite, calcined bauxite, alumina or kaolin or other alumina refractory materials), binder (such as calcium aluminate, calcium silicate, lignin or phosphates), and barium sulphate plus zinc borosilicate, that latter two providing aluminum anti-adhesion properties with barium sulphate forming the larger part of the two. The mixture can be used by mixing with water and used as conventional castable products (ramming mixes, bricks or other shapes). The combination of two components optimizes both resistance to molten aluminum and load bearing capability since reduced quantities can thereby be used.

U.S. Pat. No. 4,126,474 (Talley et al) discloses a refractory comprising a phosphate bonded plastic, ramming, mortar or castable including 0.5 to 30% barium sulphate, an aggregate (alumina-silica refractory, pyrophyllite, calcined fireclay, kaolin, bauxite, alumina, or tabular or fused alumina) and a binder (preferably a phosphate binder but also calcium aluminate, lignin or hydraulic binders). The mixture is used in unfired or fired form (but unfused). The resistance to molten aluminum penetration is said to be enhanced without loss of other properties and the mix stability in the preferred phosphate binder case is enhanced)

U.S. Pat. No. 6,008,152 (Guillo et al) discloses a refractory containing vitreaous or amorphous silica plus 0.1 to 10% barium sulphate manufactured into products preferably by slip casting and firing, for example, at over 1050° C. to make a product with superior resistance to molten aluminum.

U.S. Pat. No. 6,548,436 (Prior et al) discloses a mullite refractory formed by mixing a slurry of clay or kaolin with a water-insoluble barium or strontium compound (2 to 25%), dehydrating to create a shapeable material, forming shapes and firing at least 2650° F. (1455° C.). A range of barium or strontium compounds are suggested including carbonates, chlorides, chromates, hydroxides, sulphates, oxides but the insoluble (and non-hydrophilic) sulphate or carbonate is preferred. The firing forms a mullite from the clay that is free of cristobalite and shows superior resistance to molten aluminum. The sulphates are converted to oxides at the firing temperature.

U.S. Pat. No. 3,078,173 (Dolph) discloses a refractory material containing high concentrations of alumina (e.g. from bauxite or other alumina materials), binders (e.g. clay, lignin etc), silicates, plus 1 to 30% alkaline earth oxides or carbonates (e.g. barium or calcium) and fired, for example, at 2550° F. (1400° C.). The fired material showed improved resistance to molten aluminum.

U.S. Pat, No. 2,997,402 (McDonald et al) discloses a non-fused refractory material containing boron oxide, calcium oxide, alumina and up to 15% of other oxides including magnesium, barium, beryllium, zirconium, zinc, vanadium, chromium or molybdenum fired, for example, at 1375° C. The material contains some glassy phases and is resistant to molten aluminum.

U.S. Pat. No. 2,912,341 (Ricker) discloses a calcium aluminate bonded refractory cement (refractory aggregates including calcined fire clay, alumina or chrome ore, kyanite, olivine, fire clay and vermicullite) with 0.25 to 2.25% of an alkaline earth carbonate (e.g. barium, magnesium, strontium or calcium carbonate) fired , for example at 1700° F. (925° C.). It is suggested that the presence of the alkaline earth carbonate catalyses the formation of a ceramic bond at a lower temperature without affecting other properties.

The preceding materials require pre-mixing of the appropriate barium salt into a refractory mixture and generally firing or heating the material to be effective.

Barium sulphate or carbonate slurries (the sulphate and carbonate being almost insoluble in water) have been used for protecting surfaces from molten aluminum by forming a surface layer resistant to molten aluminum.

GB580916 (Lucas) discloses a method of protecting refractory and metal articles from attack by molten aluminum by applying a coating comprising a carbonate or a sulphate of group II elements. Barium is mentioned as one of the group II elements. It is also stated that the coating may be dried and heated, or allowed to contact molten aluminum to achieve drying and heating.

U.S. Pat. No. 6,066,289 (Eckert) mentions that one can coat a refractory trough with barium sulphate or carbonate, although no details are given.

Protective coatings have a limited protective life as they tend to spall under the thermal stresses introduced, particularly if a coated component is thermally cycled.

A further class of hydrated calcium silicate based refractory components, e.g. refractory boards, that are not fired at high temperatures before use, are widely used in handling molten aluminum since they are readily formed or machined into shapes (e.g. for casting moulds). These unfired components are well known in the art and include, for example N-17™ board sold by Pyrotek Inc which is a graphite fibre reinforced hydrated calcium silicate material.

U.S. Pat. No. 4,690,867 (Yamamoto et al) discloses a composition and manufacture of a typical un-fired hydrated calcium silicate refractory formed by combining in an aqueous slurry lime/silica mixtures with xonotlite slurry (xonotlite is a hydrated calcium silicate), wollastonite (a calcium silicate mineral) and a reinforcing fibre (e.g. carbon or alkali resistant glass fibre), and hydrothermally processing the slurry in a autoclave to form the finished material. Typically the hydrothermal process exposes the slurry to steam curing at 205° C./17 kg/cm$^2$.

European Patent Application EP 0 763 392 (Huttner et al) similarly describes a calcium silicate refractory formed by combining in an aqueous slurry, lime, silica, wollastonite, xonotlite or tobermorite, small amounts of cellulose fibre, optionally calcium silicate fines, and carbon fibre reinforcement. The slurry is dewatered by applying a pressure of 10 to 30 bars to the slurry in a mould, then autoclaved at 7 to 14 bar. This produces a matrix of tobermorite (a hydrated calcium silicate) containing wollastonite, cellulose fibres and graphite fibres, which can then be dried in air or inert gas to remove excess water.

Refractory board of this type is used, for example, to manufacture transition plates, dip-tubes and floats, and similar components where a reasonable degree of precision in shape is required and the machinability and easy formability of the materials is an advantage.

U.S. Pat. No. 4,897,294 (Libby et al) describes the use of a composite similar to the above (containing lime, silica, wollastonite, vermiculite (a hydrated Mg—Fe—Al silicate) and organic fibre reinforcement) which is slurried and moulded under pressure to form a shape. As in previous cases, the composite was then hydrothermally treated by autoclaving at 170° C., then dried of excess water at about 110° C. The resulting material was cut to shape for used as the "hot top" in a mould for casting Al—Li alloys.

U.S. Pat. No. 4,430,121 (Shima) describes the manufacture of a material suitable for covering a crucible of molten metal with a "floating" cover, by forming a slurry of lime, silica, xonotlite, wollastonite and optionally alkali resistant glass fibre, and forming a shape by dehydration moulding, controlled to achieve a target density. The shape is cured in steam in an autoclave at a stream pressure of 6 to 20 kg/cm$^2$, then dried in air at about 110 to 130° C.

The materials however have limited high temperature life since the hydrated calcium silicates undergo transformations that weaken manufactured parts, and as in other silica containing refractories, they will react with molten aluminum.

It is an object of the present invention to provide a simpler but still effective method of providing the protective effects of a barium (or similar salt) against molten aluminum which can be used on already formed components or more readily introduced into refractory mixes than heretofore.

It is a further object of the present invention to provide an unfired refractory board having superior thermal properties coupled with resistance to molten aluminum and magnesium alloys.

SUMMARY OF THE INVENTION

The present invention thus provides in one embodiment, a method of making an unfired refractory component, comprising forming a slurry comprising one or more calcium silicate refractory materials, and a barium or strontium-containing compound, forming a shape by moulding, and hydrothermally processing the shape to produce a solid component.

The component has improved thermal stability and resistance to molten aluminum or magnesium.

The present invention, in a further embodiment, provides a method of stabilizing a silica-containing porous refractory component against reactions with molten aluminum or magnesium, by forming an aqueous solution of an oxide or hydroxide of a group II alkali earth; and impregnating the component with the solution. The impregnated component is then air dried.

DETAILED DESCRIPTION OF EMBODIMENTS OF THE INVENTION

The present invention comes from the surprising discovery that in unexpected situations, barium compounds such as barium oxide, barium hydroxide or barium sulphate can be used to increase the resistance to chemical attack without firing the component.

In a first embodiment, the barium compounds are used in the production of unfired refractory components based on hydrated calcium silicate. According to this embodiment, an aqueous slurry is formed preferably comprising silica and lime plus wollastonite and optionally hydrated calcium silicates and reinforcing fibres suitable for manufacture into an unfired refractory component. To this slurry is added a barium-containing compound such as $BaSO_4$ in the form of a powder or slurry, an aqueous solution of BaO or an aqueous solution of $Ba(OH)_2$. The resultant slurry is then placed in a mould and dewatered to form a green shape. The shape is then hydrothermally processed in an autoclave to form a hydrated calcium silicate product. The product is then air dried preferably at less than 200° C. Particular compositions to which the barium-containing compound may be added, and processing details may be found in U.S. Pat. No. 4,690,867, European Patent Application EP 0 763 392, U.S. Pat. No. 4,897,294 or U.S. Pat. No. 4,430,121 or any similar hydrothermal process for manufacture of hydrated calcium silicate refractory material. Such processes are well known in the art, but have not heretofore used barium compounds to realize any advantageous properties.

The aqueous solution of BaO or $Ba(OH)_2$ is preferably prepared and used at a temperature of at least 30° C. and more preferably with water at a temperature of above 40° C. Preferably, the weight percentage of barium-containing compound in the resultant slurry is from 1% to 10%.

These unfired hydrated calcium silicate refractory boards are easily machinable materials and can be used for many applications relating to metal treatment and casting. They may, for instance, be used as inlet plates in DC casting moulds, baffle plates for metal treatment vessels, etc. The addition of a barium compound to the mixture surprisingly has a stabilizing effect on the structure, making the material more resistant to cracking and weakening at elevated temperatures used in aluminum casting operations. The barium compound also imparts increased resistance to attack by molten aluminum to the material, even though the material is merely dried and not fired prior to use.

In the second embodiment, the group II alkali earth is preferably barium or strontium. An aqueous solution of barium or strontium oxide or barium or strontium hydroxide is used to impregnate a silica-containing porous refractory component, such as a porous refractory body, paper or fabric, after which the impregnated component is air dried, preferably at a temperature of no more than 250° C. The porous refractory component may be an existing refractory component that is unfired, or one that has been fired at high temperatures before impregnation. The unfired component is preferably a hydrated calcium silicate material formed by methods as described in U.S. Pat. No. 4,690,867, European Patent Application EP 0 763 392, U.S. Pat. No. 4,897,294 or U.S. Pat. No. 4,430,121 or any similar hydrothermal process for manufacture of hydrated calcium silicate refractory material.

Water used for dissolution of the barium compound is also preferably at a temperature of at least 30° C. and more preferably at a temperature of at least 40° C. Dissolution of the barium compound is not restricted to water and other suitable solvents well known in the art may be used.

In a preferred additional step, the BaO-impregnated component described above can be post-treated by immersing it in a sulphuric acid solution to form $BaSO_4$. The compositional balance of BaO to $BaSO_4$ can be controlled by adjusting the molal concentration of the sulphuric acid. After this second step the component is again dried in air, preferably at a temperature of less than about 250° C. The drying temperature is not critical, provided the excess water is driven off before exposure to molten metal. However, temperatures in excess of about 250° C. are undesirable since there may be some conversion of the calcium silicate minerals at higher temperatures.

In both the oxide and sulphate states the barium imparts improved resistance to molten aluminum to the refractory component that has been impregnated by this method, thus permitting the advantages of barium to be imparted to components after they have been formed.

Although not wishing to be bound by any theory, it is believed the barium compounds under the relatively mild thermal treatments (hydrothermal processing or drying) interact with the hydrated calcium silicate compounds present in the refractory and modify the crystal structure in such a way as to render them less susceptible to attack by molten aluminum.

The invention is further illustrated by the following examples:

EXAMPLE 1

A slurry was prepared based on a standard commercial formulation for wollastonite board. The slurry was further treated as follows:
(a) in one case no Ba containing compounds were added;
(b) in a second case, 7% by weight of the solids BaO (as a solid powder) was added; and
(c) in a third case, 7% by weight of the solids BaSO4 (as a solid powder) was added.

The slurries were then processed using standard commercial techniques of moulding, dewatering and autoclaving to manufacture a calcium silicate refractory board.

The samples were tested for resistance to molten aluminum by exposing them to an Al-5% Mg alloy at 800° C. for 2 days, after which the general performance was assessed and the microstructure examined.

The results of the measurements are shown in Table 1 below.

TABLE 1

| Sample | Macroscopic | Microscopic |
| --- | --- | --- |
| No Ba added | Poor resistance with metal adherence and significant metal infiltration into the sample | Extensive cracking and porosity |
| BaO added | Moderate resistance with metal adherence and some metal infiltration | A few cracks and porosity. A layer of Al & Mg alloy components at surface |
| $BaSO_4$ added | Good perforance with low metal adherence and no infiltration | Substantially crack and pore free. A small layer of Al & Mg components at surface |

In addition the samples were examined using X-ray diffraction after exposure. The major component was found to be the mineral wollastonite, but in the case of added $BaSO_4$, an additional X-ray peak appeared which is believed to be a modified wollastonite structure.

EXAMPLE 2

A commercially available calcium silicate refractory board (e.g. N-17™, by Pyrotek Inc.) was machined into a transition plate for insertion into an aluminum-casting mould. The plate (with an approximate weight of 150 g) was treated as follows:
(a) in a first case, no additional treatment was used (no Ba added);
(b) in a second case, the part was immersed in a solution of 10% by weight $Ba(OH)_2$ in hot water (50° C.) for 5 minutes then dried in air at 230° C. for 30 minutes; and
(c) in a third case, a part treated as in (b) was then immersed in sulphuric acid (10% by weight $H_2SO_4$) at room temperature for 5 minutes then dried in air at 230° C. for 30 minutes.

The samples were exposed to molten aluminum alloy (AA 6082) in a casting apparatus for a series of casts. Results are shown in Table 2 below.

TABLE 2

| Sample | Results |
| --- | --- |
| No Ba | Significant metal penetration and adherence after about 4 to 5 hours |
| $Ba(OH)_2$ solution only | Minimal penetration after 16 to 18 hours |
| $Ba(OH)_2$ plus sulphuric acid | No penetration or adherence after 30 hours. |

It will be understood that throughout the above specific description, all references to aluminum or aluminum alloy apply equally to magnesium or magnesium alloy.

The invention claimed is:

1. A method of stabilizing a porous refractory component made of calcium silicate against reactions with molten aluminum or magnesium, the method consisting of:

(a) forming an aqueous solution of an oxide or hydroxide of a group II alkali earth;
(b) impregnating the component made of calcium silicate with the solution; and
(c) drying the impregnated component in air ready for contact with molten aluminum or magnesium.

2. A method according to claim 1 wherein the group II alkali earth is selected from the group consisting of barium and strontium.

3. A method according to claim 2 wherein the porous refractory component is a fired component.

4. A method according to claim 2 wherein the porous refractory component is an unfired component.

5. A method according to claim 2 wherein the aqueous solution is formed at a temperature of at least 30° C.

6. A method according to claim 2 wherein the aqueous solution is formed at a temperature of at least 40° C.

7. A method according to claim 2 wherein the drying of step (c) is carried out at a temperature of no more than 250° C.

8. A method of stabilizing a porous refractory component against reactions with molten aluminum or magnesium, the method comprising:
(a) forming an aqueous solution of an oxide or hydroxide of a group II alkali earth;
(b) impregnating the component made of calcium silicate with the solution;
(c) drying the impregnated component in air; and
(d) further impregnating the impregnated component with a sulfuric acid solution and drying the further impregnated component in air, after step (c), ready for contact with molten aluminum or magnesium.

9. A method according to claim 8 wherein the group II alkali earth is selected from the group consisting of barium and strontium.

10. A method according to claim 9 wherein the porous refractory component is a fired component.

11. A method according to claim 9 wherein the porous refractory component is an unfired component.

12. A method according to claim 9 wherein the aqueous solution is formed at a temperature of at least 30° C.

13. A method according to claim 9 wherein the aqueous solution is formed at a temperature of at least 40° C.

14. A method according to claim 9 wherein the drying of steps (c) and (d) is carried out at a temperature of no more than 250° C.

* * * * *